(12) United States Patent
Musick et al.

(10) Patent No.: US 12,188,405 B2
(45) Date of Patent: Jan. 7, 2025

(54) GENERATOR SET

(71) Applicant: Caterpillar (NI) Limited, Larne (GB)

(72) Inventors: Eric Musick, Senoia, GA (US); Andrew Graham, Belfast (GB); Michael Thompson, Larne (GB); Lee Ferguson, Belfast (GB)

(73) Assignee: Caterpillar (NI) Limited, Larne (GB)

( * ) Notice: Subject to any disclaimer, the term of this patent is extended or adjusted under 35 U.S.C. 154(b) by 9 days.

(21) Appl. No.: 17/762,293

(22) PCT Filed: Sep. 11, 2020

(86) PCT No.: PCT/EP2020/025411
§ 371 (c)(1),
(2) Date: Mar. 21, 2022

(87) PCT Pub. No.: WO2021/052624
PCT Pub. Date: Mar. 25, 2021

(65) Prior Publication Data
US 2022/0298963 A1   Sep. 22, 2022

(30) Foreign Application Priority Data
Sep. 19, 2019 (GB) .................................. 1913516

(51) Int. Cl.
| F02B 63/04 | (2006.01) |
| H02K 5/20 | (2006.01) |
| H02K 7/18 | (2006.01) |
| H02K 11/00 | (2016.01) |
| H02K 11/30 | (2016.01) |

(52) U.S. Cl.
CPC .......... *F02B 63/044* (2013.01); *F02B 63/042* (2013.01); *H02K 5/207* (2021.01); *H02K 7/1815* (2013.01); *H02K 11/0094* (2013.01); *H02K 11/30* (2016.01); *H02K 2205/09* (2013.01)

(58) Field of Classification Search
CPC ... F02B 63/042; F02B 63/044; H02K 7/1815; H02K 11/0094
See application file for complete search history.

(56) References Cited

U.S. PATENT DOCUMENTS

| 3,489,911 A | 1/1970 | Varner et al. |
| 5,022,365 A | 6/1991 | Nariyama |
| 8,207,642 B2 | 6/2012 | Lafontaine et al. |

(Continued)

FOREIGN PATENT DOCUMENTS

| CN | 102169527 B | 4/2015 |
| CN | 206673803 U | 11/2017 |

(Continued)

OTHER PUBLICATIONS

International Search Report related to Application No. PCT/EP2020/025411; reported on Nov. 11, 2020.

(Continued)

*Primary Examiner* — Sean Gugger

(57) ABSTRACT

A generator set system includes an engine and an alternator. Control panels and switchboards for operating the generator set system are integrated into a frame/enclosure that is positioned around/above the alternator. The panels and switchboards are positioned on the sides of the enclosure to allow user access.

11 Claims, 5 Drawing Sheets

(56) References Cited

U.S. PATENT DOCUMENTS

| | | | | |
|---|---|---|---|---|
| 2004/0231831 A1* | 11/2004 | Houck | ............... | B60H 1/3226 |
| | | | | 62/236 |
| 2008/0042625 A1* | 2/2008 | Konop | .................. | F02B 77/13 |
| | | | | 322/1 |
| 2009/0294234 A1* | 12/2009 | Kashani | ............. | F16F 15/0275 |
| | | | | 267/140.14 |
| 2011/0204651 A1 | 8/2011 | Nishimura et al. | | |
| 2011/0215591 A1* | 9/2011 | Farr | ...................... | F02B 63/04 |
| | | | | 290/1 R |
| 2018/0128156 A1 | 5/2018 | Watson et al. | | |
| 2018/0354712 A1* | 12/2018 | Goleczka | ............ | H02K 7/1815 |
| 2019/0338700 A1* | 11/2019 | Sarder | ................. | F02B 63/044 |

FOREIGN PATENT DOCUMENTS

| | | |
|---|---|---|
| EP | 2101017 A2 | 9/2009 |
| EP | 2648496 B1 | 5/2019 |
| GB | 2520736 A | 6/2015 |
| JP | 2016-061268 A | 4/2016 |
| KR | 2017-0070760 A | 6/2017 |
| WO | 2008024686 A2 | 2/2008 |
| WO | 2011119905 A2 | 9/2011 |
| WO | 2011128450 A1 | 10/2011 |

OTHER PUBLICATIONS

Great Britain Search Report related to Application No. 1913516.9; reported on Feb. 11, 2020.
Chinese Patent Office First Office Action for China Patent Appln. No. 202080065343.X, mailed Aug. 1, 2023 (10 pgs).

\* cited by examiner

GENERATOR SET

CROSS-REFERENCE TO RELATED APPLICATION

This Application is a 35 USC § 371 US National Stage filing of International Application No. PCT/EP2020/025411 filed on Sep. 11, 2020 which claims priority under the Paris Convention to Great Britain Patent Application No. No. 1913516.9 filed on Sep. 19, 2019.

BACKGROUND

The present disclosure relates to generators, and in particular, but not by way of limitation, to containerised generator sets, containerized generator sets with reduced/small footprints and/or the like.

Generator sets, or 'gensets', may be used to provide standby power in mission-critical applications such as data centres. Gensets are often housed in a container to provide protection to the genset components and for noise shielding. Such gensets are often referred to as 'containerised gensets'. One of the factors used to rate a containerised genset is the size, also called the footprint, of the system, with the smallest footprint having a higher customer rating. Often the power to footprint size of the genset is used as a rating of the genset.

A containerised genset comprises an engine, an alternator, a control panel(s), a switchboard(s) and/or the like. The control panels are often manufactured by different suppliers in different industries. As such, the genset may comprise a number of different control panels to control different components of the genset.

Chinese patent publication CN 102169527 B discloses a method and system for determining a mounting rack for a data centre according to the size and power consumption of the devices to be mounted in the rack.

SUMMARY

In some embodiments of the present disclosure, a generator set system comprises an engine that is operatively coupled to an alternator. The alternator includes output terminals, and a plurality of batteries. The genset includes an engine starting and battery management system panel designed to provide for selectively charging the battery and starting the engine. The genset also includes a genset control system panel that controls operation of the genset. A circuit breaker panel may be used to selectively isolate the alternator output terminals. The genset may also include a power protection system panel.

In some embodiments of the present disclosure, the panels are integrated to form an enclosure, that is positioned around/over/adjacent to the alternator. In some embodiments, the panels are integrated into a structure to form an enclosure, where panels may be positioned on sides of the structure.

In some embodiments, the enclosure formed by panels is positioned so as to provide that the enclosure is adjacent to at least two sides of the alternator. In some embodiments, the enclosure may be disposed over/around the alternator and the panels may be disposed on the sides of the enclosure, where they are accessible inside a container housing the genset. In embodiments of the present disclosure, the genset further comprises a container that houses the engine, the alternator, the batteries, and the enclosure.

Other features and aspects of this disclosure will be apparent from the following description and the accompanying drawings.

DETAILED DESCRIPTION

Figure 1:
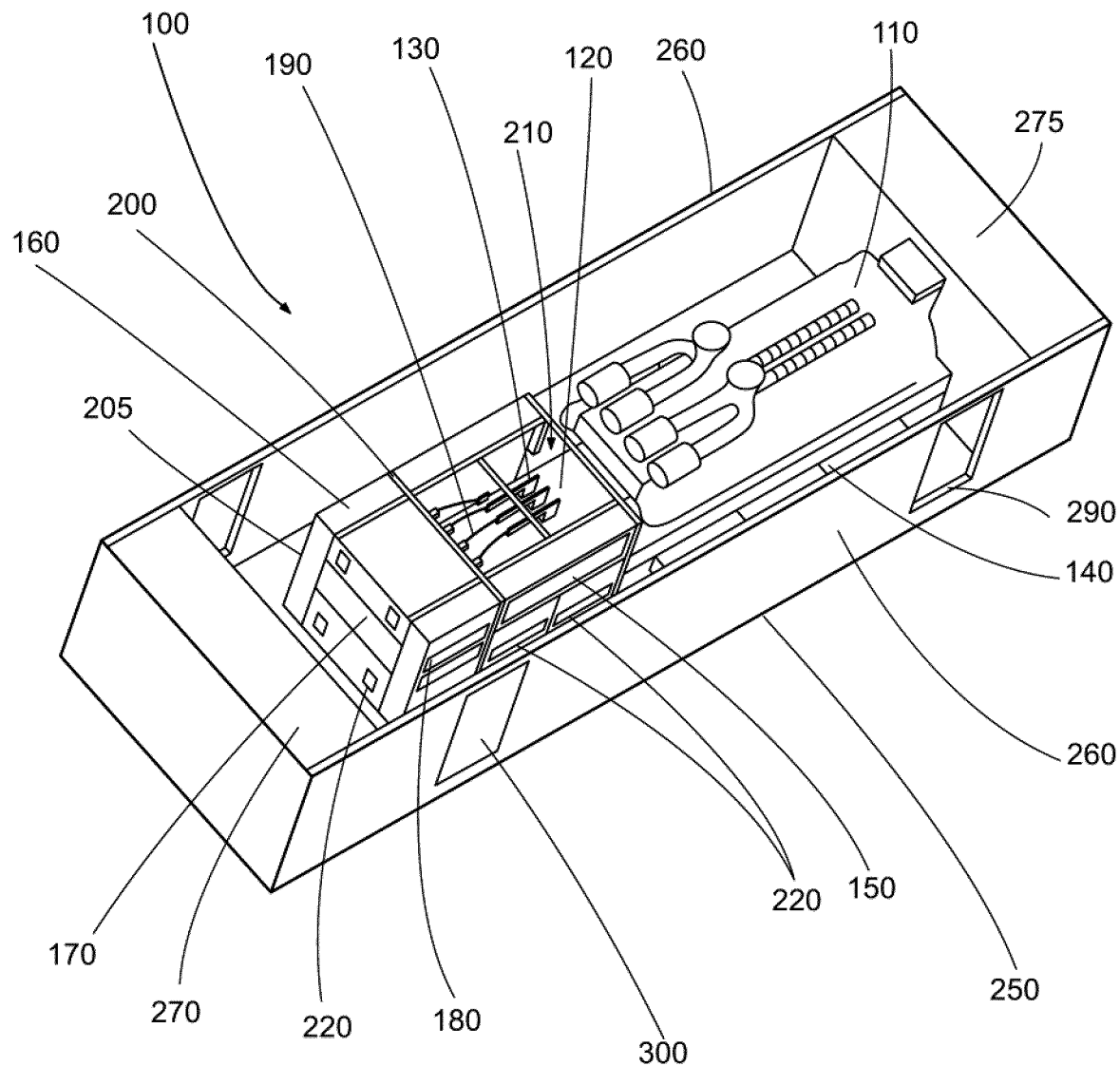
FIG. 1 shows an upper perspective view of a generator set system in which embodiments of the present disclosure may be provided.

Reference will now be made in detail to specific embodiments or features, examples of which are illustrated in the accompanying drawings. Wherever possible, corresponding or similar reference numbers will be used throughout the drawings to refer to the same or corresponding parts.

A containerised genset comprises an engine, an alternator, a control panel(s), a switchboard(s) and/or the like. Generally, control panels for the different components are manufactured by different suppliers, usually in different industries, and incorporated into the genset. As such, the genset may comprise a number of different control panels to control different components of the genset. As a result, the genset comprises separate panels for switchboard, controls, interface, and charging systems, an inefficient use of the available space in a containerized genset system that adds to the size or footprint of the genset and its complexity.

In some embodiments of the present disclosure, the control panels are integrated in an enclosure that is provided over/around the alternator/alternator barrel. In some embodiments, the positioning of the enclosure so that it is attached to a floor of the genset enclosure and is disposed over/around the alternator may produce a vibration differential between the genset and the enclosure. In some embodiments, flexible connections, such as a flexible bus connection, may be used between the genset components, such as the alternator, and panels of the enclosure, such as for example the power circuit breaker in the switchboard panel.

In some embodiments, because the enclosure is configured to enclose/fit over the alternator, the enclosure may be lifted into the container and positioned around/over the alternator/alternator barrel. This provides for a modular enclosure, comprising the genset panels, that can be efficiently added to or removed from the genset. In some embodiments, after lifting into position and being secured in place, the enclosure may be connected to the alternator power terminals via flexible bus bar, with all other necessary wiring pre-assembled in the control panel factory with plugs and connectors so no wiring occurs on the production floor, during assembly of the genset.

Panels etc. have not previously been positioned proximal to the alternator due to thermal issues. Inventors have found that the thermal issues could be addressed by controlling airflow around/through the enclosure.

In some embodiments of the present disclosure, positioning the enclosure around/over the alternator provides that the enclosure is centrally located in the genset container. This central location provides that the panels may be distributed on the sides of the enclosure where they may be accessed by a user. In some embodiments, three sides of the enclosure may be disposed around the alternator and each of these three sides may include a panel providing for user access to all three sides and space for large areas of panels, while not increasing container size.

In some embodiments of the present disclosure, power cable connections may be provided to the enclosure via a hole in the bottom of the container or a hole in the wall of the container. The positioning of the enclosure provides space for various configurations of power cables that may be connected to the panels.

Referring to FIG. 1, there is shown a generator set system 100 comprising an engine 110 operatively coupled to an alternator 120. The alternator comprises output terminals 130. In some embodiments, the alternator 120 comprises a 400V, 3500 kVA alternator although other sizes of alternator may also be used. The generator set system 100 further comprises of batteries 140 and an engine starting and battery management system panel 150 configured to selectively charge the battery 140 and to start the engine 110.

The generator set system 100 further comprises a genset control system panel 160 configured to control operation of the generator set system 100, a circuit breaker panel 170 configured to selectively isolate the alternator output terminals and a power protection system panel 180. In some embodiments, the circuit breaker panel 170 comprises a draw-out power circuit breaker. In some embodiments, the circuit breaker may be a 4000 A, 5000 A or 6300 A circuit breaker. In some embodiments, the circuit breaker panel 170 is connected to the output terminals 130 of the alternator 120 by a set of flexible bus bars or cables 190. The set of flexible bus bars or cables 190 provides some vibration isolation between the alternator 120 and the panels 150, 160, 170, 180.

In some embodiments, the power protection system panel 180 may comprise a surge protection system and/or a multi-function generator protection relay.

Figure 4:
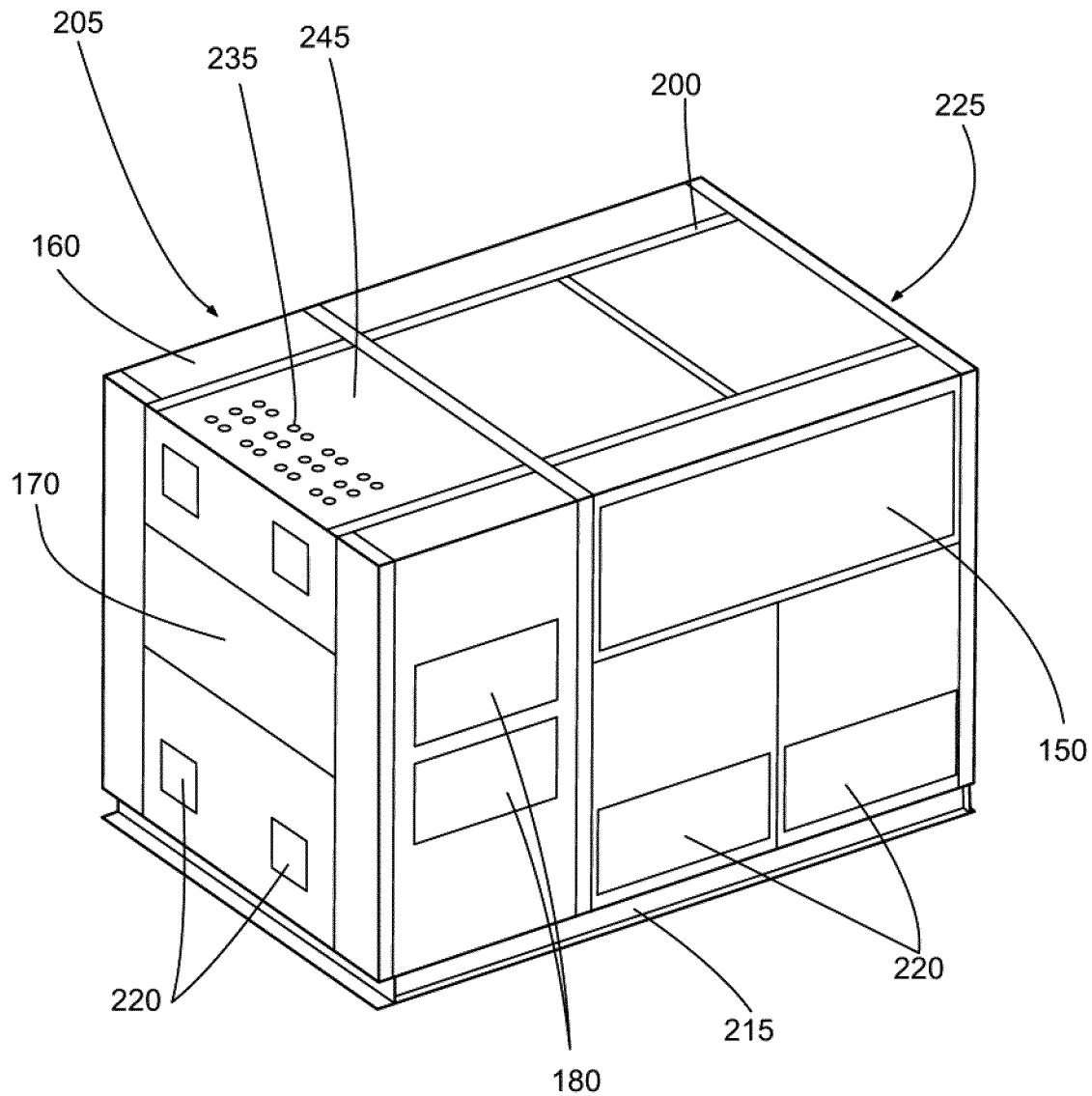
FIG. 4 is an upper perspective view of the enclosure of FIG. 1.

In some embodiments, the panels 150, 160, 170, 180 are integrated into a frame 200 to form an enclosure 205, shown in more detail in FIG. 4. The enclosure 205 is provided on a base 215. The enclosure 205 comprises an end 225 in which an opening 210 is formed such that the end 225 can fit over the alternator 120. The base 215 may include a temporary strut (not shown) extending across the end 225 to provide structural stability to the enclosure during manufacture and which is removed when placing the enclosure 205 over the alternator 120.

The enclosure 205 further comprises vents 220 configured to provide airflow to the alternator 120. A plurality of holes 235 are formed in a top panel 245 of the enclosure above the circuit breaker panel 170. The holes 235 provide access for cables (not shown) taking output power from the genset 100. The location of the circuit breaker panel 170 also allows cables to take output power form the genset by passing through a floor of the genset 100 without changing the design of the enclosure 205.

The frame 200 is provided adjacent at least two sides of the alternator 120. In the embodiment shown in the drawings, the frame 200 is provided adjacent three sides of the alternator 120 to form a 'C' shape that partially surrounds the alternator 120. Such a configuration makes use of space adjacent to and surrounding the alternator 120 for the panels 150, 160, 170, 180, which may provide a compact arrangement of the panels 150, 160, 170, 180. In some embodiments, the frame 200 and the panels 150, 160, 170, 180 occupy substantially the same floor space as the alternator 120 and thus do not add to the overall size or footprint of the generator set system 100. By surrounding the alternator 120, the enclosure 205 provides some protection to the alternator 120 as well as providing a physical barrier to reduce the chances of a person accidentally touching the high voltage/high current contacts of the alternator 120.

Further, positioning the enclosure 205 adjacent and surrounding the alternator 120 allows for the flexible bus bars or cables 190 to be relatively short. This may avoid a problem with prior systems whereby the minimum bend radius of the cables between the alternator and circuit breakers further increases the spacing between the placement of the alternator and the circuit breaker.

Figure 2:
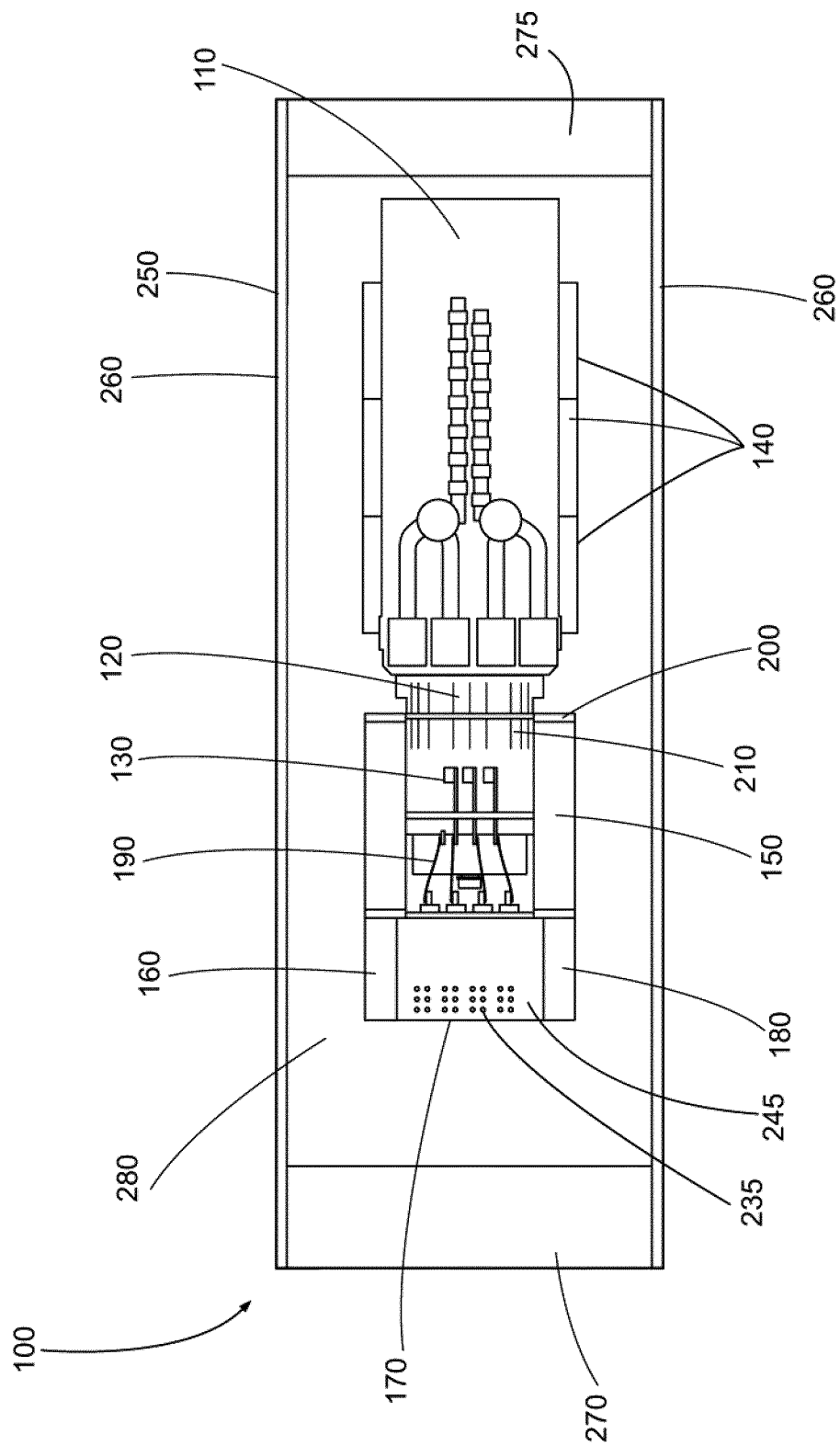
FIG. 2 is a plan view of the system of FIG. 1.
Figure 3:
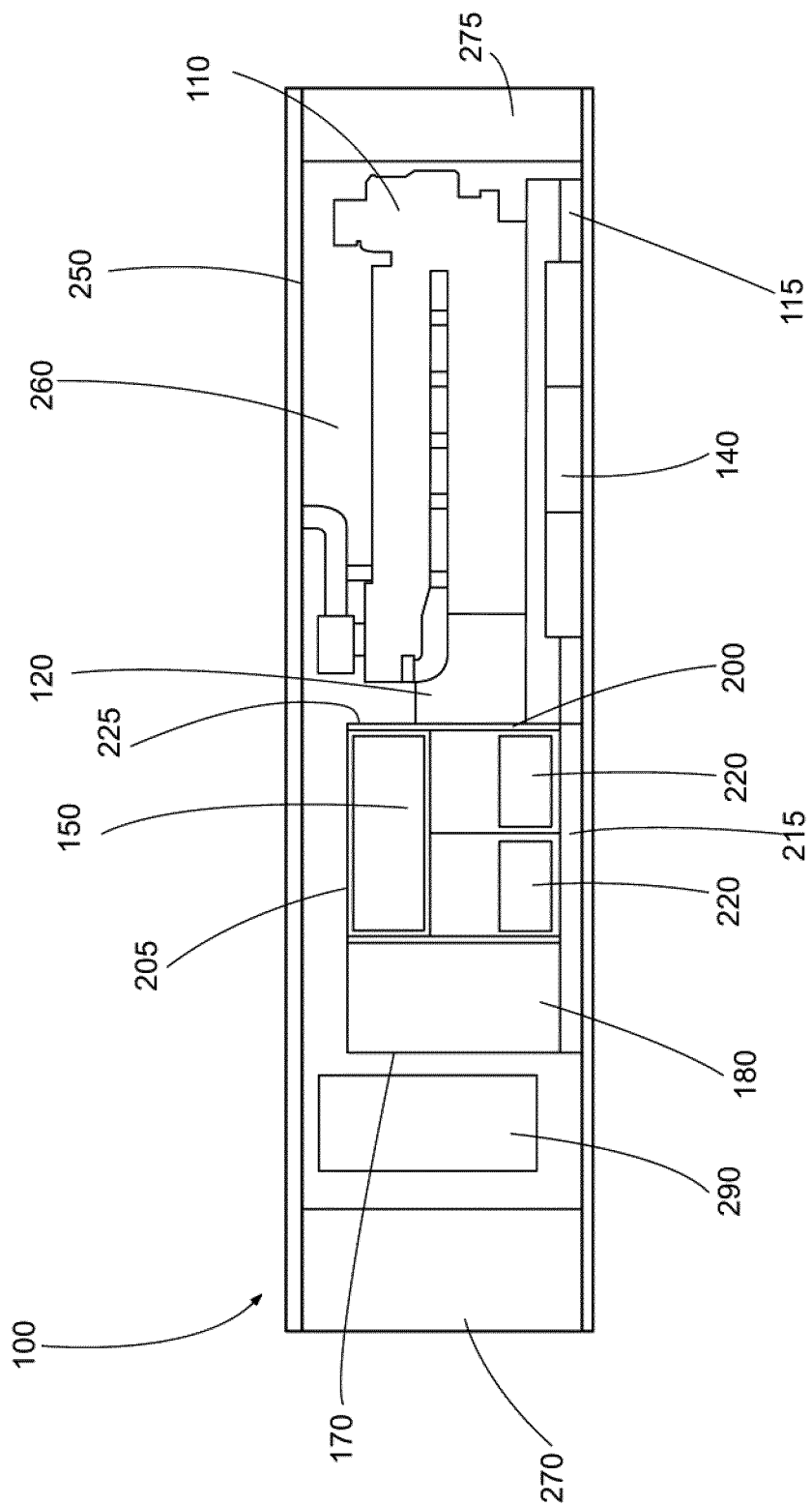
FIG. 3 is a side view of the system of FIG. 1.

Referring now to FIGS. 1-3, in some embodiments the generator set system 100 further comprises a container 250 that houses the engine 110, the alternator 120, the battery 140, the panels 150, 160, 170, 180 and the enclosure 205.

In some embodiments, the engine 110 and the alternator 120 are mounted on a plinth 115 that is vibration isolated from the floor of the container 250, such as by vibration mounts, springs or other resilient means. In such embodiments, the base 215 of the enclosure 205 is directly mounted to the floor of the container 250 to isolate the enclosure 205 and the panels 150, 160, 170, 180 from vibrations arising from the engine 110 and the alternator 120. The flexible bus bars or cables 190 act to reduce the transmission of vibrations from the alternator 120 to the circuit breaker panel 170.

In some embodiments, the container 250 comprises a pair of opposed side walls 260, an air inlet system 270 and an air outlet system 275 provided at opposing ends of the container 250. In some embodiments, the engine 110 and the alternator 120 are provided in the container 250 spaced from the side walls 260 and at least one end wall 270 to define an access path 280 which may be suitable for maintenance staff. A door 290 may be provided in one or both of the side walls 260.

In some embodiments, the engine 110 and the alternator 120 are positioned along a longitudinal axis of the container 250. In some embodiments, the engine 110 is positioned adjacent to the air outlet system 275 and the alternator 120 is positioned towards the air inlet system 270. This configuration may be beneficial for cooling the panels 150, 160, 170, 180 and the alternator 120, since the air enters the container 250 and passes across the panels 150, 160, 170, 180 and the alternator 120 before passing across the engine 110. Such a configuration may allow a closer positioning of the panels 150, 160, 170, 180 to the alternator 120 and engine 110 while maintaining a suitable operating temperature.

In some embodiments, the generator set system 100 may also provide time and/or cost benefits in manufacturing. Containerised gensets, being large, require at least some assembly and testing to be performed in a large manufacturing floor. Time on these large manufacturing floors is a precious resource for manufacturers, so reducing the time a product needs to occupy the large manufacturing floor is beneficial. A challenge with existing containerised gensets is that each of the panels are usually manufactured as separate systems by various manufacturers. These panels are then installed in the container and cabled together. Such an approach requires cabling of the panels to each other and the engine and alternator is done on the large manufacturing floor, and then tested. In contrast, the panels 150, 160, 170, 180 can be assembled and installed into the frame 200 to form the enclosure 205. The panels can then be cabled to each other and tested prior to installation in the container. Such an approach may reduce the time the generator set system 100 occupies on a large manufacturing floor, as the pre-tested enclosure 205 can be mounted around the alternator 120, cabled to it, and then final testing performed.

Figure 5:
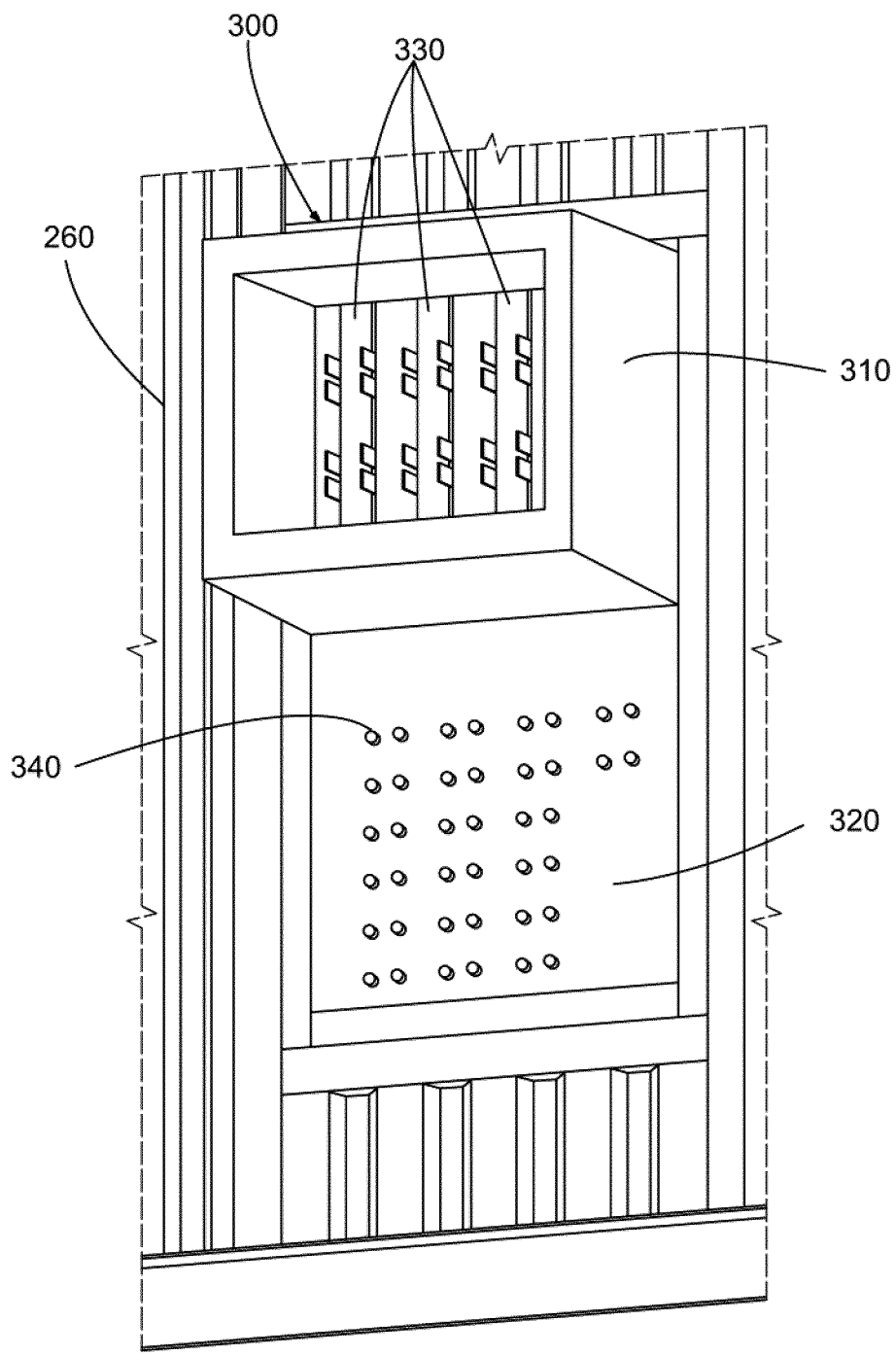
FIG. 5 is a lower perspective view of an outlet panel in which embodiments of the present disclosure may be provided.

Referring now to FIG. 1, in some embodiments, the generator set system 100 may further comprise an output panel 300 provided in one of the walls 260. The output panel 300 is shown in more detail in FIG. 5. As shown, the output panel 300 comprises an upper compartment 310 and a lower panel 320. The upper compartment 310 provides access to bus bars 330 which provide external access to power from the generator set system 100. The bus bars 330 may be integrated into the wall panel 260 and cabled to the circuit breaker panel 170. The lower panel 320 provides a plurality of quick-connect outlets 340, each of which is connected to one of the bus bars 330. The quick-connect outlets 340 allow temporary loads to be connected to the generator set system 100, such as during periodic load testing.

INDUSTRIAL APPLICATION

Embodiments of the present disclosure have been described that provide a generator set system which may provide a reduced footprint by integrating panels 150, 160, 170, 180 into a frame and enclosure 200 which surrounds the alternator 120, protects the alternator power connections 130 and flexible power connections 190, and which makes use of space around and above the alternator 120. Further, embodiments of the present disclosure have been described that provide a generator set system which may provide manufacturing benefits.

While aspects of the present disclosure have been particularly shown and described with reference to the embodiments above, it will be understood by those skilled in the art that various additional embodiments may be contemplated by the modification of the disclosed assemblies, systems and methods without departing from the scope of the present disclosure. Such embodiments should be understood to fall within the scope of the present disclosure as determined based upon the claims and any equivalents thereof.

The invention claimed is:

1. A containerized generator set system, comprising:
    an engine operatively coupled to an alternator, the alternator comprising an alternator barrel and output terminals;
    a battery, wherein the battery is positioned adjacent to a side of the engine;
    an engine starting and battery management system panel configured to selectively charge the battery and to start the engine;
    a genset control system panel configured to control operation of the generator set system;
    a circuit breaker panel configured to selectively isolate the output terminals of the alternator;
    a power protection system panel;
    an enclosure comprising a frame and at least three sides, the circuit breaker panel is integrated in a first side of the at least three sides of the enclosure, the genset control system panel or the power protection system panel is integrated into a second side of the at least three sides of the enclosure, wherein the second side is a different side than the first side, the enclosure has an end that forms an opening of the enclosure, the enclosure configured to be positioned over the alternator barrel and the output terminals of the alternator, and when positioned, each of the at least three sides of the enclosure are adjacent a different side of the alternator, the end of the enclosure fits over the alternator and surrounds the alternator, such that the alternator is located in the opening, wherein the enclosure includes a plurality of holes in a top panel above the circuit breaker panel, and wherein the plurality of holes provide access for cables taking output power from the genset,
    a container that houses the engine, the alternator, the battery, and the enclosure, the enclosure is directly mounted to a floor of the container, the engine and the alternator are mounted on a plinth that is vibration isolated from the floor of the container, the engine, alternator, and enclosure are spaced apart from opposed side walls and at least one end wall of the container; and
    a flexible connection that connects the output terminals of the alternator to the circuit breaker panel, the flexible connection configured to provide vibration isolation between the alternator and the panels integrated into the first side and the second side of the enclosure.

2. The system of claim 1, wherein at least three sides of the alternator are each adjacent at least one of the integrated panels.

3. The system of claim 1, wherein the enclosure is disposed around a barrel of the alternator.

4. The system of claim 3, wherein the engine and the alternator are positioned along a longitudinal axis of the container.

5. The system of claim 2, wherein at least one end wall defines an access path.

6. The system of claim 5, wherein the container further comprises an air inlet system and an air outlet system provided at opposing ends of the container, wherein the engine is positioned adjacent the air outlet system and the alternator is positioned adjacent the air inlet system.

7. The system of claim 1, wherein the enclosure further comprises at least one vent configured to provide airflow to the alternator.

8. The system of claim 1, wherein the engine starting and battery management system panel, the genset control system panel, the circuit breaker panel and the power protection system panel are each integrated into a side of the enclosure.

9. The system of claim 1, further comprising a set of bus bars provided in a wall of the container, and an output panel formed in the wall providing external access to the bus bars, the bus bars being connected to the circuit breaker panel.

10. The system of claim 9, wherein the output panel further comprises a plurality of quick-connect outlets.

11. The system of claim 1, in which a first side and a second side of the at least three sides of the enclosure are parallel to the opposed side walls of the container, and a third side of the at least three sides of the enclosure and the end of the enclosure are parallel to the opposed end walls of the container.

* * * * *